(12) United States Patent
Kumar et al.

(10) Patent No.: US 12,284,214 B2
(45) Date of Patent: Apr. 22, 2025

(54) SYSTEM AND METHOD FOR TELEMETRY DATA BASED EVENT OCCURRENCE ANALYSIS WITH RULE ENGINE

(71) Applicant: Virsec Systems, Inc., San Jose, CA (US)

(72) Inventors: Sanjay Kumar, Bangalore (IN); Manoj Paul, San Jose, CA (US); Rao Gattupalli, Los Gatos, CA (US)

(73) Assignee: Virsec Systems, Inc., San Jose, CA (US)

( * ) Notice: Subject to any disclaimer, the term of this patent is extended or adjusted under 35 U.S.C. 154(b) by 283 days.

(21) Appl. No.: 17/649,225

(22) Filed: Jan. 28, 2022

(65) Prior Publication Data

US 2023/0138805 A1    May 4, 2023

(30) Foreign Application Priority Data

Oct. 29, 2021   (IN) .............................. 202141049540

(51) Int. Cl.
*H04L 9/40* (2022.01)
*H04L 67/02* (2022.01)
*H04L 67/30* (2022.01)
*H04L 67/5682* (2022.01)

(52) U.S. Cl.
CPC .......... *H04L 63/20* (2013.01); *H04L 63/1416* (2013.01); *H04L 67/02* (2013.01); *H04L 67/30* (2013.01); *H04L 67/5682* (2022.05)

(58) Field of Classification Search
CPC ..... H04L 63/20; H04L 63/1416; H04L 67/02; H04L 67/30; H04L 67/5682; H04L 63/0263; H04L 63/1425
See application file for complete search history.

(56) References Cited

U.S. PATENT DOCUMENTS

| | | | | |
|---|---|---|---|---|
| 5,867,651 A | * | 2/1999 | Dan | H04L 63/14 726/3 |
| 7,281,018 B1 | * | 10/2007 | Begun | G06F 40/143 707/999.102 |
| 8,463,925 B1 | * | 6/2013 | Nath | H04L 63/0263 709/230 |
| 8,566,444 B1 | * | 10/2013 | Yona | H04L 63/0263 709/225 |

(Continued)

FOREIGN PATENT DOCUMENTS

WO    2023/102531 A1    6/2023

OTHER PUBLICATIONS

Sqreen, "Documenation", retrieved at https://docs.sqreen.com/, Downloaded from Internet Apr. 29, 2022, 2 pages.

(Continued)

*Primary Examiner* — John B King
(74) *Attorney, Agent, or Firm* — Hamilton, Brook, Smith & Reynolds, P.C.

(57) ABSTRACT

Embodiments determine event, e.g., performance degradation, security breach, etc., occurrence based on telemetry data. An embodiment receives telemetry data, e.g., data based on an HTTP transaction, and a rule associated with the telemetry data. The rule defines one or more filters for processing the telemetry data. In turn, a rule engine is modified in accordance with the received rule. The received telemetry data is processed with the modified rule engine to determine event occurrence.

18 Claims, 8 Drawing Sheets

(56) References Cited

U.S. PATENT DOCUMENTS

| | | | |
|---|---|---|---|
| 8,826,443 B1* | 9/2014 | Raman | G06F 21/6245 |
| | | | 726/26 |
| 10,528,725 B2* | 1/2020 | Samuel | H04L 63/20 |
| 10,922,363 B1* | 2/2021 | Paiz | H04L 67/02 |
| 11,781,883 B1* | 10/2023 | Dabell | G01C 21/3874 |
| | | | 701/409 |
| 2004/0107360 A1* | 6/2004 | Herrmann | H04L 63/20 |
| | | | 726/1 |
| 2004/0205360 A1 | 10/2004 | Norton et al. | |
| 2005/0268335 A1* | 12/2005 | Le | H04L 63/0263 |
| | | | 726/13 |
| 2005/0273593 A1* | 12/2005 | Seminaro | H04L 43/00 |
| | | | 713/151 |
| 2008/0276316 A1 | 11/2008 | Roelker et al. | |
| 2014/0123288 A1* | 5/2014 | Lee | H04L 63/1416 |
| | | | 726/23 |
| 2019/0065755 A1* | 2/2019 | Hatsutori | H04L 63/14 |
| 2020/0120107 A1* | 4/2020 | McGrew | G06N 20/00 |
| 2020/0293916 A1* | 9/2020 | Li | G06F 9/5066 |
| 2020/0382529 A1* | 12/2020 | Higgins | H04L 63/1425 |
| 2020/0387597 A1* | 12/2020 | Karasev | G06F 21/566 |
| 2021/0097168 A1* | 4/2021 | Patel | G06F 21/554 |
| 2021/0367847 A1* | 11/2021 | Vasseur | H04L 43/10 |

OTHER PUBLICATIONS

Sqreen, Protect, "Protect your app with Sqreen" retrieved at https://docs.sqreen.com/protection/introduction/Downloaded from Internet Apr. 29, 2022, 20 pages.

International Search Report and Written Opinion received for PCT Patent Application No. PCT/US2022/080826, mailed on Mar. 31, 2023, 11 pages.

* cited by examiner

SYSTEM AND METHOD FOR TELEMETRY DATA BASED EVENT OCCURRENCE ANALYSIS WITH RULE ENGINE

RELATED APPLICATION

The Application claims priority under 35 U.S.C. § 119 or 365 to India application No. 202141049540, filed Oct. 29, 2021.

The entire teachings of the above application are incorporated herein by reference.

BACKGROUND

Hypertext Transfer Protocol (HTTP) is a popular standard protocol widely used by the World Wide Web to facilitate transfer of information between clients (such as Internet browsers) and web/application servers. The HTTP protocol defines how messages are formatted and transmitted, and what actions web/application servers and browsers should take in response to various commands indicated by HTTP formatted messages. Typically, telemetry data is generated at web and application servers that records HTTP interactions (and resulting actions and commands) between web/application servers and their clients. Traditionally, this telemetry data is collected in the form of web logs for later processing, but more sophisticated implementations may instrument an HTTP pipeline at web/application servers to extract this telemetry information in real-time. Telemetry data is very useful to run offline or real-time analytics for purposes of Application Performance Monitoring (APM), enforcing web application security, and/or deriving actionable business intelligence.

SUMMARY

Many tools already exist that provide the capability to triage recorded or real-time HTTP telemetry data. However, these existing tools are based on fixed function implementations. Fixed functions are just that, fixed, i.e., cannot be changed without modifying and recompiling the code implementing the function. As such, fixed functions are written to receive a particular input, perform particular processing, and provide a particular output. If you want to change the input, processing, or output of the function you need to change the function itself, i.e., the source code of the function, and this new code must be re-compiled. As such, adding new capabilities to existing telemetry data triaging tools typically requires either enhancements to existing fixed function implementations or writing entirely new functions themselves. Accordingly, rolling out new capabilities in such HTTP telemetry data processing tools requires software upgrades. This lack of flexibility provided by existing telemetry data processing tool is problematic.

The present disclosure solves this problem and provides a new flexible rule-engine based approach where implementing a new HTTP telemetry data processing function is as easy as writing a rule/set of rules. The functionality provided by the present disclosure can adapt to handle different input and provide different processing and output by simply changing the rules. In this way, certain aspects described herein can provide different processing of telemetry data without changing code and re-compiling. This makes the functionality significantly more flexible than existing methods. According to an aspect, such rules are written according to a pre-defined syntax and can be readily submitted to a rule-engine to execute. The execution of these rules by the rule-engine provides the same functionality provided by current fixed function implementations, but without requiring any need for software upgrades.

An example implementation is directed to a computer-based method for triaging telemetry data. According to an aspect, the method determines event occurrence based on the telemetry data. One such method begins by receiving telemetry data and a rule associated with the telemetry data. The rule defines one or more filters for processing the telemetry data. In turn, a rule engine, e.g., a generic rule engine, is modified in accordance with the received rule. Then, the received telemetry data is processed with the modified rule engine to determine event occurrence, i.e., if an event will occur, is occurring, or occurred.

In certain aspects of the present disclosure, the telemetry data can be based upon multiple different events/actions. For instance, the telemetry data can be based on a HTTP transaction, processing an HTTP transaction, and/or multiple HTTP transactions.

According to an aspect, rules are constructed and defined in accordance with a grammar. In addition to defining one or more filters for processing telemetry data, rules can also define: (i) output of a first filter utilized by a second filter, (ii) an event profile comprising a group of filters or sequence of filters (as indicating an event), (iii) a feature comprising one or more event profiles, i.e., a collection of event profiles, and/or (iv) a namespace comprising one or more features, i.e., a logical grouping of features.

According to an aspect, processing the telemetry data with the modified rule engine identifies which of the one or more filters are activated in processing the received telemetry data. In such a method, event occurrence is determined based on the identified activated filters.

Where the rule defines an event profile, according to an aspect, the rule engine is modified in accordance with the event profile. Processing the received telemetry data with the rule engine modified in accordance with the event profile comprises determining event occurrence if the one or more filters are activated in accordance with the event profile. Similarly, in another aspect where the rule defines a namespace, the rule engine is modified in accordance with the namespace and an event profile associated with the namespace. Processing the received telemetry data with the rule engine modified in accordance with the namespace and the event profile associated with the namespace includes determining event occurrence if the one or more filters are activated in accordance with the event profile associated with the namespace.

According to yet another aspect, modifying the rule engine in accordance with the received rule comprises defining functionality of a finite state automaton implemented by the rule engine in accordance with the received rule. A plurality of different events may be detected. For instance, the determined events may be particular triggers on application and database performance degradation. In other words, such an embodiment may determine if application or database performance, e.g., access and response time, operates outside of some defined performance characteristics or qualities. Further still, according to another aspect, determined events may include a security breach, a hijacked session, and a behavior defined by the rule, e.g., an unexpected behavior, amongst other examples. Further still, the processing may determine event occurrence in real-time (i.e., an event is occurring or is going to occur) or may determine if an event occurred in the past.

Another aspect of the present disclosure is directed to a system that includes a processor and a memory with computer code instructions stored thereon. The processor and the memory, with the computer code instructions, are configured to cause the system to implement any functionality or combination of functionality described herein.

Yet another aspect of the present disclosure is directed to a cloud computing implementation to determine event occurrence, i.e., if an event is occurring, will occur, or occurred, based on telemetry data. Such an aspect is directed to a computer program product executed by a server in communication across a network with one or more clients. The computer program product comprises instructions which, when executed by one or more processors, causes the one or more processors to implement any functionality or combination of functionality described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
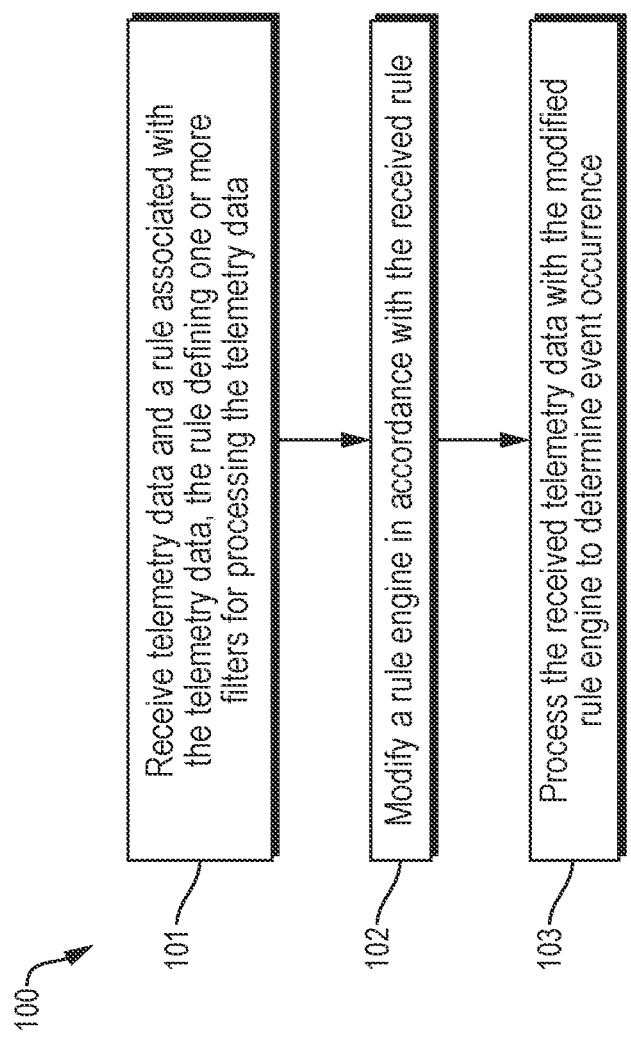
FIG. 1 is a flowchart of a method for determining event occurrence based on telemetry data according to an embodiment.

A description of example embodiments follows.

When a web/application server receives a HTTP request from a client, it handles the request based on the Uniform Resource Locator (URL). The URL is specified as one of the header fields in a HTTP request and the URL refers to a resource located on the application server. Multiple actions may be performed by an application server as part of handling an HTTP request. These actions may include performing local/remote file read/write operations, invoking local system commands, and performing operations on backend database(s), amongst other examples. These actions typically conclude with an application server generating an HTTP response that is sent back to the client. A sophisticated telemetry agent can instrument various software methods involved in performing the aforementioned actions and generate data related to each of these actions. A more trivial implementation may extract telemetry data from web logs. Irrespective of the method, telemetry data of an HTTP transaction is associated with a well-defined sequence of steps, as outlined below. Some steps are optional and depend on a web/application server's business logic.

Step 1—HTTP Request: HTTP request is the first message that is sent by a client (such as an internet browser) to a web/application server. An HTTP request includes header and body fields. Both header and body fields can be part of telemetry data. Examples of telemetry data collected during an HTTP request event include: URL, HTTP Method, HTTP request header fields (e.g., Content-Type), HTTP request body (e.g., user supplied data), and time of HTTP request arrival, amongst other examples.

Step 2—File Read/Write (Optional): Application code may perform read/write of local or remote files as part of handling an incoming HTTP request. Telemetry data associated with such an event may include: file path, file name, remote URL, and read/write operation, amongst other examples.

Step 3—Operating System (OS) Calls (Optional): Application code may invoke some local operating system calls as part of HTTP request processing. Telemetry data associated with this event may include system command(s) that are being invoked, amongst other examples.

Step 4—Database Queries (Optional): Applications that use some backend database may invoke database queries as part of HTTP transaction handling. These databases may be SQL or noSQL type databases. Telemetry data associated with database queries may include the actual query being made by application code, response status of the query, and actual database content returned by the backend database, amongst other examples.

Step 5—HTTP Response: An HTTP transaction concludes with generation and transmission of an HTTP response. The HTTP response includes header and body fields. Telemetry data associated with a HTTP response may contain the header and body content and timestamp of transmission, amongst other examples.

In addition to the foregoing data, telemetry data may also include data that indicates the context of the HTTP transaction associated with the telemetry data. For instance, the aforementioned steps (or subsets thereof) from a given HTTP transaction can be tied together, i.e., grouped, in a context. For example, a unique HTTP transaction ID may be assigned to messages (e.g., the data from steps 1-5) from a given HTTP transaction. Telemetry data sent for each of these messages can be grouped by stamping each message with this unique HTTP transaction ID. Similarly, there is a notion of a client session (for example, an internet browser session)—that may consist of multiple HTTP transactions. A different unique ID, e.g., Session ID, may be assigned to all HTTP transactions within a given session. Telemetry data sent for each of these HTTP transactions can be stamped with the same Session ID.

Embodiments of the present disclosure provide a flexible rule-based finite automaton that consumes telemetry data from the above-mentioned HTTP transaction messages in real-time and produces a final state of interest. Example final states of interest include determination of an HTTP transaction as not conforming with defined performance characteristics, e.g., transaction time, classification of an HTTP transaction as a security breach, or classification of a client session as a hijacked session, amongst other examples.

FIG. 1 is a flowchart of one such example method 100 that processes telemetry data to determine event occurrence. The method 100 starts at step 101 by receiving telemetry data and a rule associated with the telemetry data. The method 100 is computer implemented and, as such, the telemetry data and rule may be received from any point communicatively coupled to the computing device implementing the method 100. The rule received at step 101 defines one or more filters for processing the telemetry data. To continue, at step 102, a rule engine is modified in accordance with the received rule. According to an embodiment, the rule modified at step 102 includes a computer program that is configured to understand and process the rule defined in step 101. A rule engine also maintains runtime state that results from execution of rules using its computer program. While the computer program of the rule engine does not change, the runtime state is updated as part of step 102. In turn, at step 103, the received telemetry data is processed with the modified rule engine to determine event occurrence, i.e., if an event will occur, is occurring, or has occurred. Step 103 can entail the rule engine executing the rule from step 101 on telemetry data to ascertain occurrence of certain event(s) based on result(s) of executing the rule.

In embodiments of the method 100, the telemetry data received at step 101 can be based upon multiple different events/actions. For instance, the telemetry data can be based on a HTTP transaction, processing an HTTP transaction, and/or multiple HTTP transactions. As such, in embodiments, the telemetry data can be based on HTTP messages and also associated system events involved in, or resulting from, processing an HTTP message. These system events may include database reads, database writes, system service function calls, and local and remote file reads and writes, amongst other examples.

The rule or rules received at step 101 are constructed and defined in accordance with a grammar. In an embodiment, the grammar dictates keywords and syntax on how a rule should be constructed. In addition to defining one or more filters for processing telemetry data, rules can also define: (i) output of a first filter utilized by a second filter, (ii) an event profile comprising a group of filters or sequence of filters, (iii) a feature comprising one or more event profiles, and/or (iv) a namespace comprising one or more features. In an embodiment of the method 100, event profiles, features, and namespaces serve as constructs for organizing filters and, specifically, define how filters process telemetry data. Further details regarding filters, event profiles, features, and namespaces that may be utilized in embodiments of the method 100 are described hereinbelow.

According to an embodiment of the method 100, processing the telemetry data with the modified rule engine at step 103 identifies which of the one or more filters are activated in processing the received telemetry data. In such an embodiment, event occurrence is determined at step 103 based on the identified activated filters.

In an embodiment where the rule received at step 101 defines an event profile, the rule engine is modified at step 102 in accordance with the event profile. In such an embodiment, processing the received telemetry data with the rule engine modified in accordance with the event profile at step 103 comprises determining event occurrence at step 103 based on what filters are activated by processing the telemetry data and, in particular, if the filters are activated in accordance with the event profile.

Similarly, in an embodiment where the rule received at step 101 defines a namespace, the rule engine is modified in accordance the namespace and an event profile associated with the namespace at step 102. At step 103, the received telemetry data is processed with the rule engine modified in accordance with the namespace and the event profile associated with the namespace. Moreover, the determination of event occurrence at step 103 is based on what filters are activated by processing the telemetry data and, in particular, if the filters are activated in accordance with the event profile associated with the namespace.

To illustrate such an embodiment, consider a simplified example where telemetry data from an HTTP transaction with the URL www.myspace.com is received at step 101. The rule received at step 101 defines a namespace that indicates that all telemetry data resulting from HTTP transactions with the URL www.myspace.com are processed with event profile1. Event profile1 indicates that telemetry data is processed through filter1 and, then, filter2 or filter3 depending on the output of filter1, and, if processing the telemetry data activates filter3, the HTTP transaction (that the telemetry data is based on) satisfies a user configured event condition, e.g., according to the definition set by the user the HTTP transaction is causing a security breach or is not in compliance with desired performance quality (amongst other examples). Upon receiving this telemetry data and the rule at step 101, the rule engine is modified at step 102 in accordance with the namespace and associated event profile. According to an embodiment, the rule engine program remains unchanged, but the state maintained in the rule engine is modified as the rule from step 101 is applied to telemetry data. At step 103, the telemetry data is processed with the modified engine and if filter1 and filter2 are activated it is determined that no event is occurring and if filter1 and filter3 are activated it is determined that the user configured event is occurring, e.g., a security breach is occurring or performance fell below a desired metric.

Embodiments of the method 100 may utilize a rule engine that implements and employs a finite state automaton, i.e., finite state machine, to determine event occurrence. In such an embodiment of the method 100, modifying the rule engine at step 102 in accordance with the rule (received at step 101) comprises defining functionality of the finite state automaton implemented by the rule engine in accordance with the received rule, i.e., defining an internal state of the finite state automaton. This may include, for example, defining a state related to match/no match of telemetry data to a predefined set of regular expressions that are part of the rule received at step 101. Advantageously, in such an embodiment, the functionality of the finite state automaton is defined without needing to perform an image upgrade, i.e., performing a software update. In an embodiment, the finite state automaton is driven by the rule received at step 101 and, as such, an update to the rule is sufficient to achieve detection of a new class of events at step 103 by the rule engine modified at step 102. Comparatively, fixed function solutions require an update to their computer program in order to detect a new class of events. Such an embodiment processes the telemetry data with the finite state automaton to determine event occurrence.

The method 100 may detect a plurality of different events. Determined events may include any desired user configured event. For example, determined events may include a defined level of performance degradation in application code or backend database, crossing a threshold to log specific messages of an HTTP transaction, a security breach, a hijacked session, and a behavior defined by the rule, e.g., an unexpected or undesirable behavior, amongst other examples. Moreover, the processing at step 103 may determine event occurrence in real-time or may determine if an event occurred in the past.

Embodiments may implement various constructs to process telemetry data so as to determine event occurrence. Hereinbelow are definitions of constructs that be may be employed in embodiments. These constructs (definitions below) can be put together to describe an embodiment of the disclosure as a rule-based finite state automaton.

Filter

Figure 2:
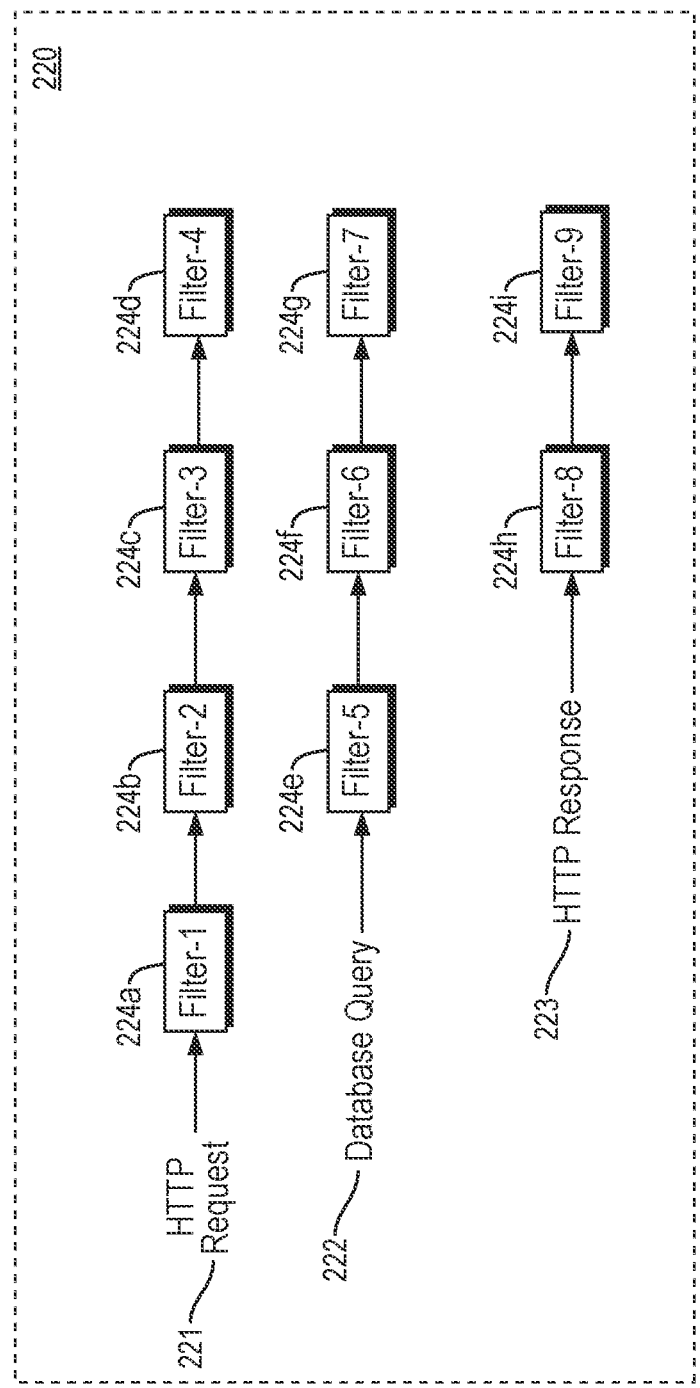
FIG. 2 depicts a system for processing telemetry data through filters according to an embodiment.

Filters are a logical construct, implemented as a set of statements to analyze an HTTP transaction message and detect a specific condition. In an embodiment of the present disclosure, a filter becomes active whenever a defined condition of that filter is met. Embodiments apply filters to specific HTTP transaction message(s). FIG. 2 illustrates an example system 220 where HTTP transactional messages 221, 222, and 223 go through a defined set of filters 224a-i to determine event occurrence. In the system 220, the HTTP request 221 is processed by the filters 224a-d. Likewise, the database query 222 is processed by the filters 224e-g and the HTTP response 223 is processed by the filters 224h-i.

Each filter, e.g., the filters 224a-i, has properties which define behavior of the variables within the filter's namespace. Filter properties that may be used in embodiments include life, message type, and filter pattern database, amongst other examples. Life defines lifetime of a filter and the filter's state variables. State variables can be valid for the duration of an HTTP transaction ID lifetime, Session ID lifetime, or a customized lifetime. Message type defines message type(s) for which a filter is valid. Messages can be valid for one or more of the HTTP transactional messages, such as HTTP request, HTTP response, and database query, etc. An embodiment utilizes a filter pattern database that defines a set of patterns, typically in PERL compatible regular expression language. This pattern database is looked up by systems implementing embodiments, e.g., a rule engine, whenever a filter in question is applied on a HTTP transactional message(s) of interest.

An example of a filter definition, i.e., rule, is given below:
FILTER httpreq_filter_myregexdb (life=http_transaction_unique_id, msg=HTTP_REQ, dbname=myregexdb) {
.........
return somevariable;
}

The above filter is defined to detect occurrence of a pattern from provided myregexdb in an HTTP transaction. The filter has lifetime of an HTTP transaction, is applicable to HTTP request type messages and has a reference to a pattern database (myregexdb) used for lookup when this filter is applied.

An example of another filter definition is given below:
FILTER httpreq_filter_crlf (life=http_transaction_unique_id, msg=HTTP_REQ, dbname=dbcrlf) {
.........
return somevariable;
}
This filter is defined to detect a Carriage Line Return Feed (CRLF) violation in an HTTP transaction. The filter has lifetime of an HTTP transaction, is applicable to HTTP request type messages and has a reference to a pattern database (dbcrlf) used for lookup when this filter is applied.

Each filter exports a final state after the filter finishes execution. This final state is a collection of various variables that may get set as filter execution occurs and may be stored in local or remote memory storage by a system implementing the filter. This final state data can be imported by any other filter, as required or desired. Ability to export and import states among various filters allows implementation of complex functionality that may span across multiple HTTP transactional messages.

Figure 3:
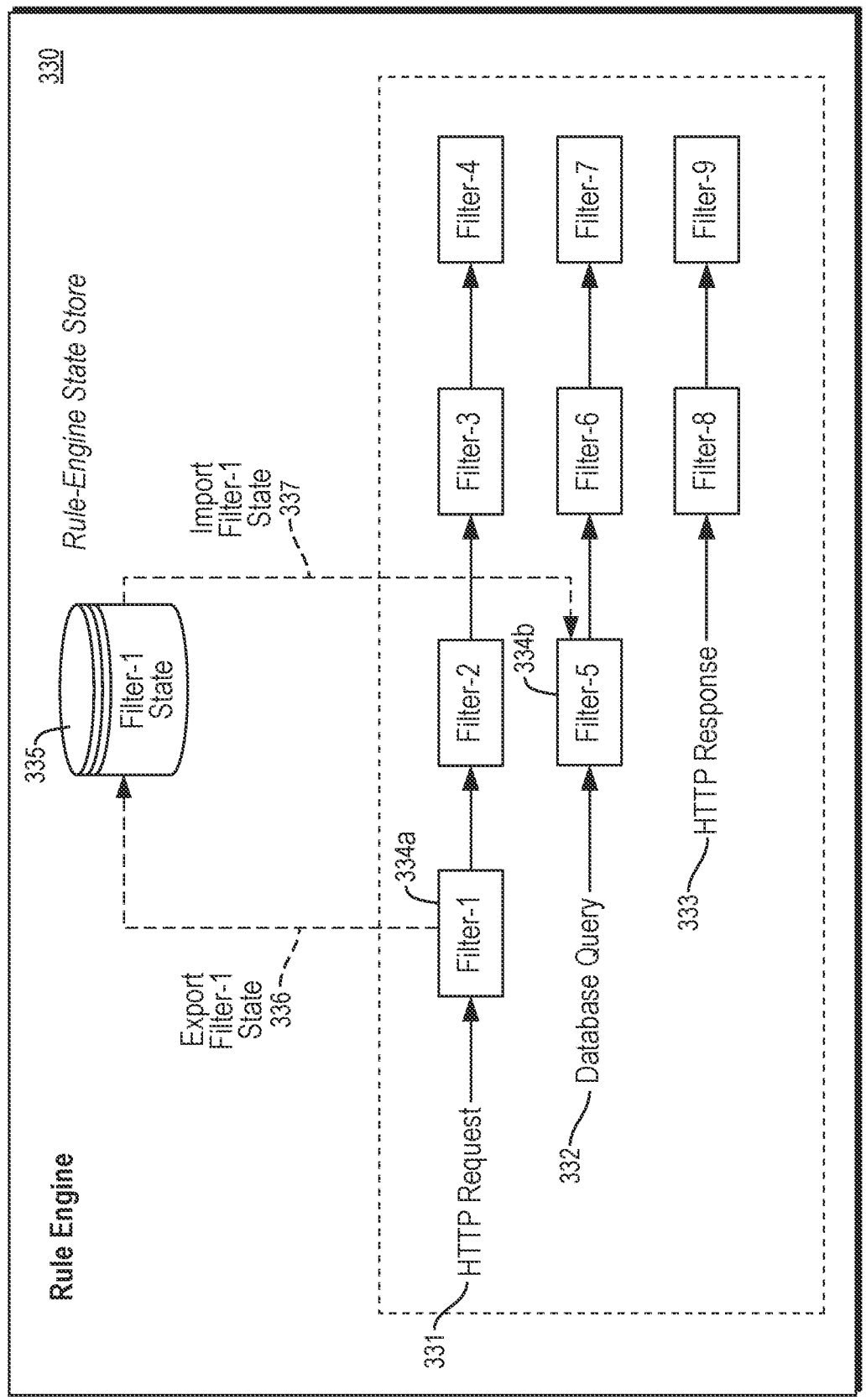
FIG. 3 is a block diagram of a computer-based engine implementing an example embodiment.

FIG. 3 shows one implementation in the rule engine 330 where states are exported and imported among filters. In the rule engine 330, the filter 334a state 336 is exported to Rule-Engine state store 335. Data from the Rule-Engine state store 335 can be utilized by any of the filters. For instance, FIG. 3 illustrates the state data 337 (which may be the state of the filter 334a) being imported by the filter 334b. This interaction allows for variables set by the filter 334a when processing the HTTP request message 331 to be used later when the rule engine 330 processes the database query 332 using the filter 334b. Such functionality allows states, i.e., variables, resulting from processing the various parts of the HTTP transaction (HTTP request 331, database query 332, and HTTP response 333) to be used when the various parts of the HTTP transaction occur.

Event Profile

An event profile binds a set of filters to one of the potential final classification states desired. For example, if the objective is to classify an HTTP transaction as a performance outlier, an event profile that defines permutation of filters to capture a timestamp that crosses a certain threshold can be specified. Similarly, if the objective is to classify an HTTP transaction as malicious (ATTACK/THREAT) or BENIGN, then an event profile defines a permutation of filters which, when met, would classify an HTTP transaction as an ATTACK/THREAT or BENIGN.

An event profile defines a sequence of filters, which may become active in a pre-defined order or any order. An event profile becomes active whenever all the filters in that event profile become active. In an embodiment, as HTTP transaction messages are received, the HTTP transaction messages go through a set of filters defined in the event profile, and an active state of these filters accordingly gets established. The determination of event occurrence (e.g., event classification as attack/threat or benign) is based on the combination of filters (typically including different message types) becoming active in a certain order. An event profile provides a mechanism for defining this grouping of filters.

Figure 4:
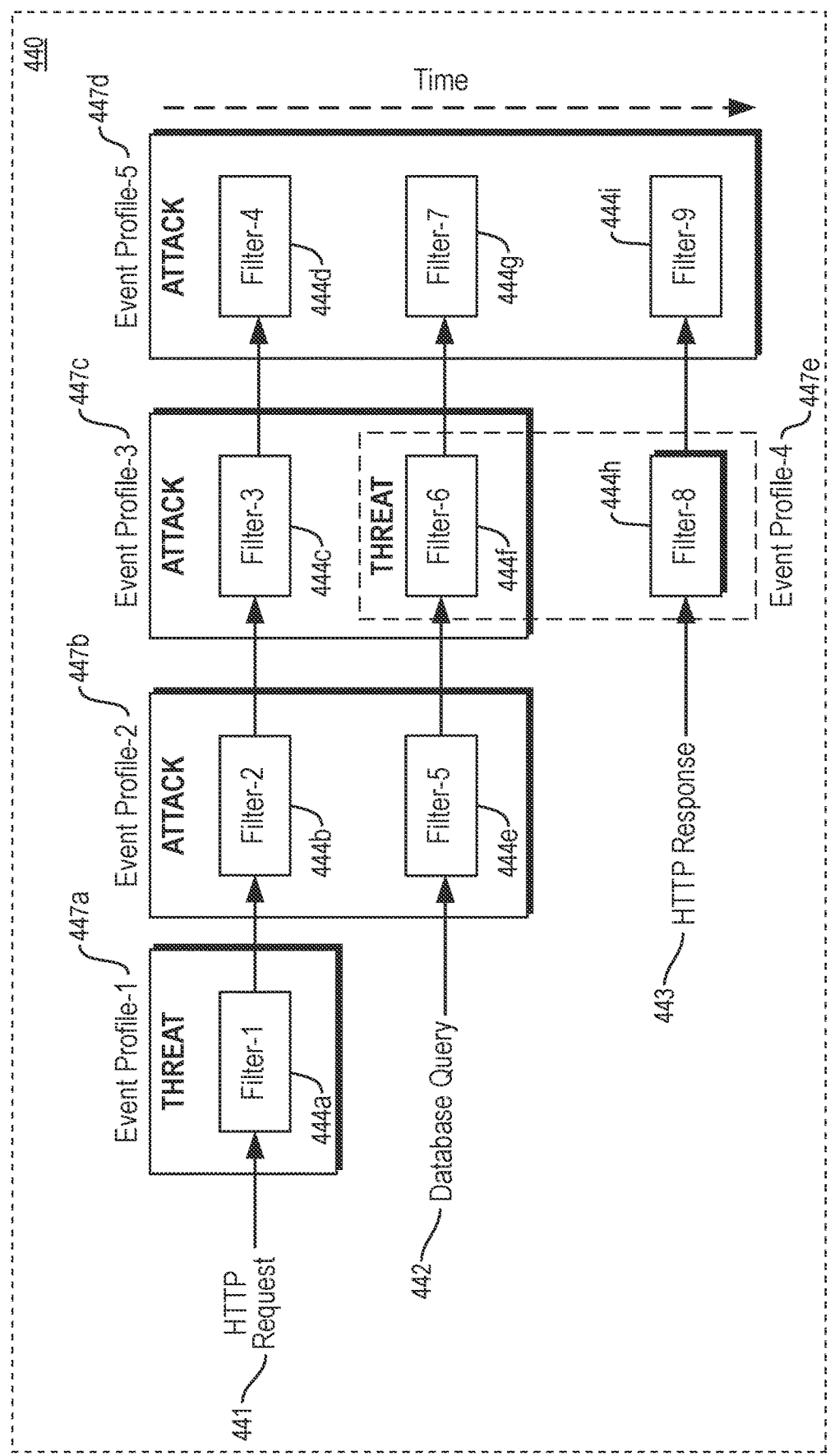
FIG. 4 is a graphical illustration of a system implementing an event profile according to an embodiment.

The system 440 in FIG. 4 is an example where the goal is to classify an HTTP transaction (which includes the HTTP request 441, database query 442, and HTTP response 443) as malicious (ATTACK/THREAT) or BENIGN.

In the system 440 the vertical cross section of filters represents event profiles 447a-e which emit desired final classification states. The system, i.e., engine, 440 starts with a default classification state of an HTTP transaction (the HTTP request 441, database query 442, and HTTP response 443) as BENIGN, but may promote final classification state to THREAT or ATTACK if a corresponding event profile becomes active.

In FIG. 4 there are nine filters, namely filters 444a-i. There are five event profiles, event profile 447a (filter 444a, THREAT), event profile 447b (filter 444b, filter 444e, ATTACK), event profile 447c (filter 444c, filter 444f, ATTACK), event profile 447e (filter 444f, filter 444h, THREAT) and event profile 447d (filter 444d, filter 444g, filter 444i, ATTACK). In the system 440, the HTTP request message 441 is passed through filters 444a-d. Database query message 442 is passed through filters 444e-g and HTTP response message 443 is passed through filters 444h-i.

To illustrate functionality of the system 440, consider the example of the event profile 447b. Event profile 447b is defined below:
event_profile EventProfile2 [ATTACK, order (fixed, filter2, filter5)]

As such, the event profile 447b is activated when filter2 444b (which acts on HTTP request 441) and filter5 444e (which acts on database query 442) become active in order, i.e., filter2 444b is activated and then filter5 444e is activated.

It is noted that while the system 440 is described as being configured to classify an HTTP transaction as malicious or benign, embodiments are not so limited and, instead, embodiments can be configured to determine if HTTP transactions correspond with any user defined qualities.

For example, the system 550 is configured to classify an HTTP transaction (which includes the HTTP request 551, SQL event 552, and HTTP response 553) as a performance outlier and, such classifications may result in detection of one or more performance degradation events.

Figure 5:
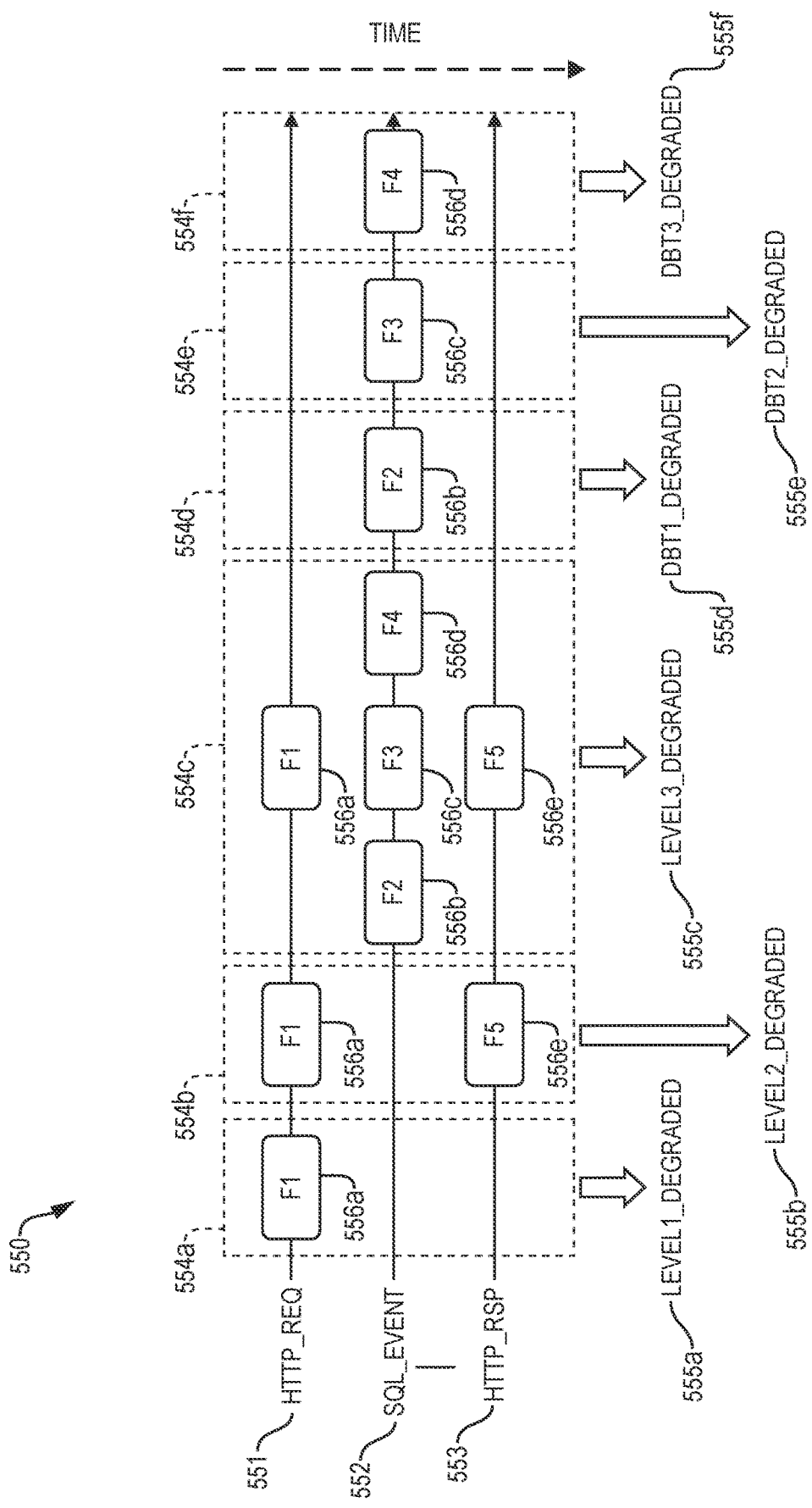
FIG. 5 depicts a system utilizing event profiles in an embodiment.

In the example of FIG. 5, performance of a web application is being evaluated. The example web application uses a SQL database and has three main tables (referred to as DBT1, DBT2, DBT3). The objective of the system 550 is to assess the web application and database access performance on a continuous basis.

In such an implementation, the system, i.e., engine, 550 starts with a default classification state of an HTTP transaction (the HTTP request 551, SQL event 552, and HTTP response 553) as NOT_DEGRADED, and may promote the default classification to one or more of the final degraded classification states 555a-f. In the system 550 the vertical cross section of filters represents event profiles 554a-f which emit desired final classification states LEVEL1_DEGRADED 555a, LEVEL2_DEGRADED 555b, LEVEL3_DEGRADED 555c. DBT1_DEGRAED 555d, DBT2_DEGRDED 555c, and DBT3_DEGRADED 555f, if a corresponding event profile 554a-f becomes active.

The system 550 implements five defined filters 556a-c.

The filter 556a, HTTP_REQ_PERF_FILTER (F1), reads special Key-Val pairs in HTTP Request 551 telemetry messages that specify timestamp (ts_http_req_start) when application logic starts processing HTTP Request 551 and timestamp (ts_http_req_end) when application logic finishes processing HTTP Request 551. This filter 556a has pre-programmed threshold value (ts_http_req_thresh) of maximum processing latency. If (ts_http_req_end-ts_http_req_start)>ts_http_req_thresh, the filter 556a gets activated.

Filter 556b, DBT1_PERF_FILTER (F2), reads special Key-Val pairs in SQL Event 552 telemetry message that specify timestamp (ts_dbt1_start) when application logic starts accessing DB Table 1 and timestamp (ts_dbt1_end) when application logic finishes accessing DB Table 1 and gets the results back. This filter 556b has pre-programmed threshold value (ts_dbt1_thresh) of maximum processing latency of accessing DB Table1. If (ts_dbt1_end-ts_dbt1_start)>ts_dbt1_thresh, the filter 556b is activated. This filter 556b also requires a special Key-Val pair in SQL Event telemetry message 552 that identifies SQL table accessed as Table-1.

The filter 556c. DBT2_PERF_FILTER (F3), reads special Key-Val pairs in SQL Event telemetry message 552 that specify timestamp (ts_dbt2_start) when application logic starts accessing DB Table 2 and timestamp (ts_dbt2_end) when application logic finishes accessing DB Table 2 and gets the results back. Filter 556c has pre-programmed threshold value (ts_dbt2_thresh) of maximum processing latency of accessing DB Table2. If (ts_dbt2_end-ts_dbt2_start)>ts_dbt2_thresh, this filter 556c is activated.

This filter 556c also requires a special Key-Val pair in SQL Event telemetry message 552 that identifies the SQL table accessed as Table-2.

Filter 556d, DBT3_PERF_FILTER (F4), reads special Key-Val pairs in SQL Event telemetry message 552 that specify timestamp (ts_dbt3_start) when application logic starts accessing DB Table 3 and timestamp (ts_dbt3_end) when application logic finishes accessing DB Table 3 and gets the results back. This filter 556d has pre-programmed threshold value (ts_dbt3_thresh) of maximum processing latency of accessing DB Table3. If (ts_dbt3_end-ts_dbt3_start)>ts_dbt3_thresh, this filter will get activated. The filter 556d also requires a special Key-Val pair in SQL Event telemetry message 552 that identifies SQL table accessed as Table-3.

Filter 556c, HTTP_RSP_PERF_FILTER (F5), reads special Key-Val pairs in HTTP Response telemetry message 553 that specify timestamp (ts_http_rsp_start) when application logic starts processing HTTP Response 553 and timestamp (ts_http_rsp_end) when application logic finishes processing and generating HTTP Response 553. This filter 556e has pre-programmed threshold value (ts_http_rsp_thresh) of maximum processing latency. If (ts_http_rsp_end-ts_http_rsp_start)>ts_http_rsp_thresh, this filter 556e gets activated.

The following are possible events 555a-f of interest in the system 550: Event LEVEL1_DEGRADED (order (fixed, HTTP_REQ_PERF_FILTER)) (555a); Event LEVEL2_DEGRADED (order (any, HTTP_REQ_PERF_FILTER, HTTP_RSP_PERF_FILTER)) (555b); Event LEVEL3_DEGRADED (order (any, HTTP_REQ_PERF_FILTER, HTTP_RSP_PERF_FILTER, DB1_PERF_FILTER, DB2_PERF_FILTER, DB3_PERF_FILTER)) (555c); Event DBT1_DEGRADED (order (fixed, DB1_PERF_FILTER)) (555d); Event DBT2_DEGRADED (order (fixed, DB2_PERF_FILTER)) (555e); and Event DBT3_DEGRADED (order (fixed, DB3_PERF_FILTER)) (555f).

To illustrate operation of the system 550, consider the example of event profile 554c, which is attempting to determine if the HTTP transaction (HTTP request 551, SQL event 552, and HTTP response 553), is degraded. Event profile 554c is defined below:

Event LEVEL3_DEGRADED (order (any, HTTP_REQ_PERF_FILTER, HTTP_RSP_PERF_FILTER, DB1_PERF_FILTER, DB2_PERF_FILTER, DB3_PERF_FILTER))

As such, the event profile 554c is activated when F1 556a (which acts on HTTP request 551); F2 556b, F3 556c, and F4 556d (which act on SQL event 552) become active; and F5 556e (which acts on HTTP response 553) are activated, in any order.

Feature

A feature is a set of event profiles. A feature set is applicable for a given URL or a set of URLs. According to an embodiment, whenever an HTTP transactional message is received for a URL, it goes through the feature set associated with that URL. In the example below, a Feature named "Assess_Perf myURL" is defined for URL http://myspace.com:

Feature "Assess_Perf myURL":
http://myspace.com {
    Event LEVEL1_DEGRADED (order (fixed, HTTP_REQ_PERF_FILTER))
    Event LEVEL2_DEGRADED (order (any, HTTP_REQ_PERF_FILTER, HTTP_RSP_PERF_FILTER))

Event LEVEL3_DEGRADED (order (any, HTTP_REQ_PERF_FILTER, HTTP_RSP_PERF_FILTER, DB1_PERF_FILTER, DB2_PERF_FILTER, DB3_PERF_FILTER))
Event DBT1_DEGRADED (order (fixed, DB1_PERF_FILTER))
Event DBT2_DEGRADED (order (fixed, DB2_PERF_FILTER))
Event DBT3_DEGRADED (order (fixed, DB3_PERF_FILTER))
}

This example feature contains six event profiles that detect different levels of potential performance degradation in a functional application. For instance, event LEVEL1_DEGRADED may identify that only HTTP_REQ message processing is degrading, event LEVEL2_DEGRADED may detect degradation in both HTTP_REQ and HTTP_RSP messages of the HTTP Transaction in question on http://myspace.com, etc.

While the foregoing example feature is directed to performance evaluation, embodiments can define features toward any desired event detection. For instance, an example Feature named "Secure myURL" directed toward malicious event detection is defined for URL http://myspace.com:
Feature "Secure myURL":
    http://myspace.com {
    Event event1 (attack, order (fixed, filter1, filter2));
    Event event2 (attack, order (fixed, filter1, filter2, filter3));
    Event event3 (attack, order (fixed, filter1, filter4, filter5));
    Event event4 (attack, order (fixed, filter6, filter7));
    Event event5 (attack, order (fixed, filter6, filter8));
}

This example feature contains five event profiles that detect an attack of certain kinds. For instance, event1 may identify a cross site script attack, event2 may detect a SQL injection attack on http://myspace.com, etc.

Namespace

A namespace defines a correlated set of features which reside within a namespace. A namespace is a logical grouping of one or more features. By grouping features in specific namespaces, embodiments facilitate managing each namespace separately. Examples where such a logical grouping of features is applicable is a service provider rolling out web application security and/or performance monitoring services to multiple clients. Namespaces can be employed to provide a mechanism to roll out different sets of features to different clients. Below is an example namespace definition for a security service:
Namespace:
Customer-1 {
["Secure myURL", "Secure remoteLogin"];
}
Customer-2 {
    ["APM webapp" ];
}

Below is an example namespace definition for performance monitoring:
Namespace:
Customer-1 {
["Monitor_PerfmyURL1", "Monitor_PerfmyURL2"];
}
Customer-2 {
    ["APM webapp" ];
}

Figure 6:
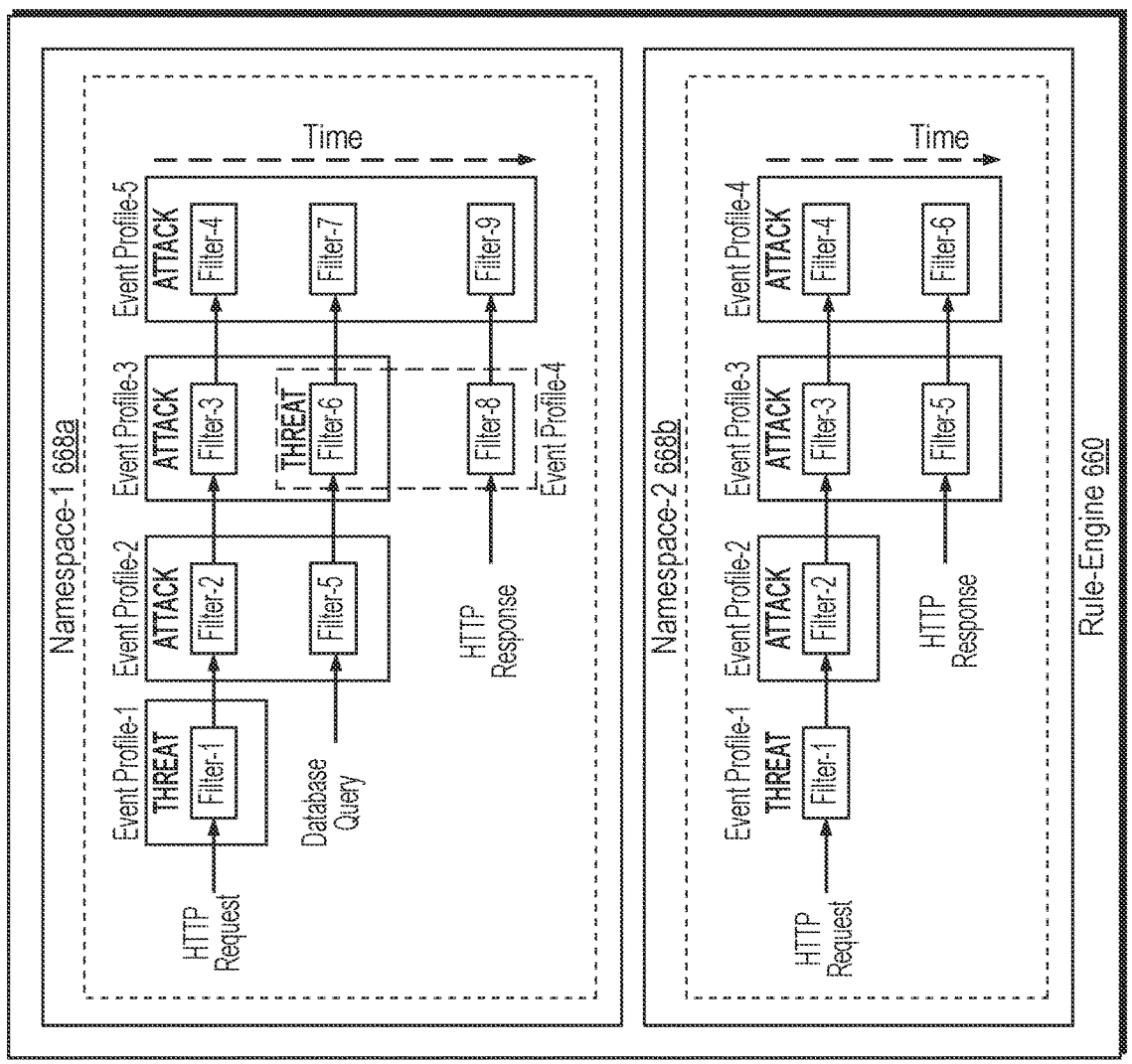
FIG. 6 depicts a system utilizing namespaces in an embodiment to process telemetry data to determine event occurrence.

FIG. 6 shows an example system 660 that includes the namespaces 668a-b. The namespaces 668a-b create a logical separation of workload in the rule-engine 660.

Embodiments utilize rule definitions to implement telemetry data processing. In an embodiment, the rules define the functionality of the system, e.g., rule engine or finite state automaton, for processing telemetry data. The rules can define filters, event profiles, features, and/or namespaces for processing telemetry data. Below is an example rule definition. The below example rule is written to implement a Reflected-XSS and SQL-Injection security feature, i.e., determine if a Reflected-XSS and SQL-Injection attack is caused by an HTTP transaction. filter httpreq_filter (life=uuid, msg=HTTP_REQ, type=util) {
/**
* This filter extracts HTTP req key/val pairs, and exports it so that
* other filter can use it
*/
hreq=keyval(HTTP_REQ, KEY_ALL, --);
export(hreq);
return hreq;
}
filter httpreq_filter_sql(life=uuid, msg=HTTP_REQ, dbname=dbsql) {
/**
* If any SQL keyword pattern is found in HTTP req, save the pattern and export
* will be used by other filters.
*/
sqlmatch=load("sql.gf");
export(sqlmatch);
return sqlmatch;
}
filter sqlinjection_filter_attack(life=message, msg=DB_QUERY) {
/**
*Algorithm—
*1. Check if SQL keywork pattern was found in http req, by importing "sqlmatch"
*2. Extracts all user input from SQL query (by parsing SQL query through true parser)
*3. If all user input from SQL query is also present in sqlmatch, and it's not exact match
—i.e. if its substring match only, no exact match, call it out as attack.
*/
import httpreq_filter (hreq);
import httpreq_filter_sql (sqlmatch);
debug(hreq);
debug(sqlmatch);
sqry=keyval(DB_QUERY, KEY_ALL, --);
debug(sqry);
subreq=match(sqry, hreq);
debug(subreq);
/**
sqlmatch will have more than one value, this will match all the value with SQL query, and only keep those value which are used in SQL query.
first argument as '-' signifies to match it (sqlmatch) with all sql query keyval.
*/
hval=match(-, sqlmatch);
debug(hval);
/**
This will match hval from hreq, and save full input as matched string

```
/
psqlmatch=match(hreq, hval, full);
debug(psqlmatch);
if(psqlmatch) {
    libattack=libinjection(psqlmatch);
}
debug(libattack);
origquery=keyval(DB_QUERY, KEY, "_sql_", msg);
p1=replace(psqlmatch, "'", """);
check1=match(origquery, p1);
debug(check1);
check2=match(origquery, psqlmatch);
debug(check2);
check=check1|check2;
debug(check);
cln_psqlmatch=replace(psqlmatch, "\\'", """);
debug(cln_psqlmatch);
cln_psqlmatch=replace(cln_psqlmatch, "\"", """);
debug(cln_psqlmatch);
cln_psqlmatch=replace(cln_psqlmatch, "'", """);
debug(cln_psqlmatch);
cln_sgry=replace(sqry, "\\'", """);
debug(cln_sqry);
cln_sgry=replace(cln_sgry, "\"", """);
debug(cln_sqry);
cln_sqry=replace(cln_sqry, "'", """);
debug(cln_sqry);
submatch=match(cln_psqlmatch, cln_sgry);
debug(submatch);
exactmatch=match(cln_psqlmatch, cln_sgry, exact);
debug(exactmatch);
noexactmatch=!exactmatch;
sqlattack=submatch & noexactmatch;
debug(sqlattack);
sqlinjection_attack1=sqlattack & check;
debug(sqlinjection_attack1);
sqlinjection_attack=union(sqlinjection_attack1, libattack);
debug(sqlinjection_attack);
export(sqry, submatch, hval, psqlmatch);
return sqlinjection_attack;
}
filter     sqlexception_filter(life=message, msg=SQLEXCEPTION) {
    exceptionmsg=keyval(SQLEXCEPTION, key, "_exception_msg_", msg);
    origquery=keyval(SQLEXCEPTION, KEY, "_sql_", msg);
    export(exceptionmsg, origquery);
    return exceptionmsg;
}
report reportsqlexception desc: "SQLi" (sqlexceptionevent)
{
    import sqlexception_filter (exceptionmsg, origquery);
    //"Description—": "Sql exception detected",
    "Exception reason:": exceptionmsg,
    origquery
}
report reportsql desc: "SQLi" (sqlevent) {
    import sqlinjection_filter_attack (submatch, sqry, hval, psqlmatch);
    //"Description—": "Sql injection attack detected",
    psqlmatch
}
filter     httpreq_filter_xss_1(life=uuid, msg=HTTP_REQ, dbname=dbxss1) {
    catanfq=load("xssANFQ.gf", full);
    debug(catanfq);
    catd=load("xssD.gf");
    debug(catd);
    catafq=load("xssAFQ.gf");
    debug(catafq);
    /* find subset based on key (i.e. same key) */
    cna=subsetkey(catanfq, catd);
    debug(cna);
    /* find subset based on key (i.e. same key) */
    ca=subsetkey(catafq, catd);
    debug(ca);
    /* Get union of cna and ca */
    catad=union(cna, ca);
    debug(catad);
    export(catad);
    return catad;
}
filter     httpreq_filter_xss_2(life=uuid, msg=HTTP_REQ, dbname=dbxss2) {
    catbnfq=load("xssBNFQ.gf", full);
    debug(catbnfq);
    catbfq=load("xssBFQ.gf");
    debug(catbfq);
    catb=union(catbfq, catbnfq);
    debug(catb);
    export(catb);
    return catb;
}
filter     httpreq_filter_xss_3(life=uuid, msg=HTTP_REQ, dbname=dbxss3) {
    catc=load("xssC.gf");
    debug(catc);
    export(catc);
    return catc;
}
filter httpreq_filter_xss(life=uuid, msg=HTTP_REQ) {
    import httpreq_filter_xss_1 (catad);
    import httpreq_filter_xss_2 (catb);
    import httpreq_filter_xss_3 (catc);
    xssmatch=union(catc, catad, catb);
    debug(xssmatch);
    export(xssmatch);
    return xssmatch;
}
filter reflected_xss_filter(life=message, msg=HTTP_RES) {
    /**
    *Algorithm—
    *1. Check if XSS pattern was found in HTTP req (xssmatch from previous filter will be active)
    *2. if same patterns are also found in HTTP res, then it's a reflective XSS attack if http_status is "0" else
    *its threat
    */
    import httpreq_filter_xss (xssmatch);
    debug(xssmatch);
    hres=keyval(HTTP_RES, KEY_ALL, --);
    debug(hres);
    xss_common=match(hres, xssmatch);
    httpstatus=keyval(HTTP_RES, KEY, "_http_status_", msg);
    debug(xss_common);
    debug(httpstatus);
    export(httpstatus, xss_common);
    return xss_common;
}
filter     reflected_xss_filter_threat(life=message, msg=HTTP_RES) {
```

```
/**
*Algorithm—
*1. Check if XSS pattern was found in HTTP req (xss-
   match from previous filter will be active)
*2. if same patterns are also found in HTTP res, then it's
   a reflective XSS attack if http_status is "0" else
*its threat
*/
import reflected_xss_filter (httpstatus);
code=constant("0");
exec=unequal(code, httpstatus);
debug(exec);
return exec;
}
filter         reflected_xss_filter_attack(life=message,
msg=HTTP_RES) {
/**
*Algorithm—
*1. Check if XSS pattern was found in HTTP req (xss-
   match from previous filter will be active)
*2. if same patterns are also found in HTTP res, then it's
   a reflective XSS attack.
*/
import reflected_xss_filter (httpstatus);
code=constant("0");
exec=equal(code, httpstatus);
debug(exec);
return exec;
}
filter  httpres_filter_xss_1(life=uuid,  msg=HTTP_RES,
dbname=dbxss1) {catanfq=load("xssANFQ.gf", full);
   debug(catanfq);
   catd=load("xssD.gf");
   debug(catd);
   catafq=load("xssAFQ.gf");
   debug(catafq);
   cna=subsetkey(catanfq, catd);
   ca=subsetkey(catafq, catd);
   catad=union(cna, ca);
   export(catad);
   return catad;
}
filter  httpres_filter_xss_2(life=uuid,  msg=HTTP_RES,
   dbname=dbxss2) {
   catbnfq=load("xssBNFQ.gf", full);
   debug(catbnfq);
   catbfq=load("xssBFQ.gf");
   debug(catbfq);
   catb=union(catbfq, catbnfq);
   debug(catb);
   export(catb);
   return catb;
}
filter  httpres_filter_xss_3(life=uuid,  msg=HTTP_RES,
dbname=dbxss3) {
   catc=load("xssC.gf");
   debug(catc);
   export(catc);
   return catc;
}
filter httpres_filter_xss(life=uuid, msg=HTTP_RES) {
   import httpres_filter_xss_1 (catad);
   import httpres_filter_xss_2 (catb);
   import httpres_filter_xss_3 (catc);
   xssmatch=union(catc, catad, catb);
   debug(xssmatch);
   export(xssmatch);
   return xssmatch;
}
report reportxssthreat desc: "ReflectedXSS" (xssevent1) {
   import reflected_xss_filter(xss_common);
   //"Description—":"Reflected XSS threat detected",
   :xss_common
}
report reportxssattack desc: "ReflectedXSS" (xssevent2) {
   import reflected_xss_filter(xss_common);
   //"Description—":"Reflected XSS attack detected",
   :xss_common
}
namespace: virsec URL(any)
{
   event sqlevent (ATTACK, order(fixed, httpreq_filter, htt-
      preq_filter_sql, sqlinjection_filter_attack));
   event sqlexceptionevent (THREAT, order(fixed, sqlex-
      ception_filter));
   event xssevent1 (THREAT, order(fixed,
      ANY (httpreq_filter_xss_1, httpreq_filter_xss_2,
      httpreq_filter_xss_3),httpreq_filter_xss,    reflected_
         xss_filter,
      reflected_xss_filter_threat));
   event xssevent2 (ATTACK, order(fixed,
      ANY (httpreq_filter_xss_1, httpreq_filter_xss_2, htt-
         preq_filter_xss_3),
      httpreq_filter_xss, reflected_xss_filter, reflected_xss-
         _filter_attack));
   FEATURE featid:1 sqlfeature (sqlevent, sqlexception-
      event);
   FEATURE featid:2 xssfeature (xssevent1, xssevent2);
}
```

Embodiments provide numerous benefits over existing methods. For instance, an embodiment provides a generic Rule-Engine that allows instantiation of any new processing of HTTP transactional telemetry data without performing a software upgrade. Another embodiment implements a generic Rule-Engine architecture based on a set of pattern-based filters that act on telemetry data derived from HTTP transactions occurring on web/application servers with an objective to classify HTTP transactions to any arbitrary finite set of outcomes. Moreover, another generic Rule-Engine architecture embodiment implements a finite state automaton where state information can be shared across asynchronous events spanning across any arbitrary context (such as a single transaction or a single session).

Figure 7:
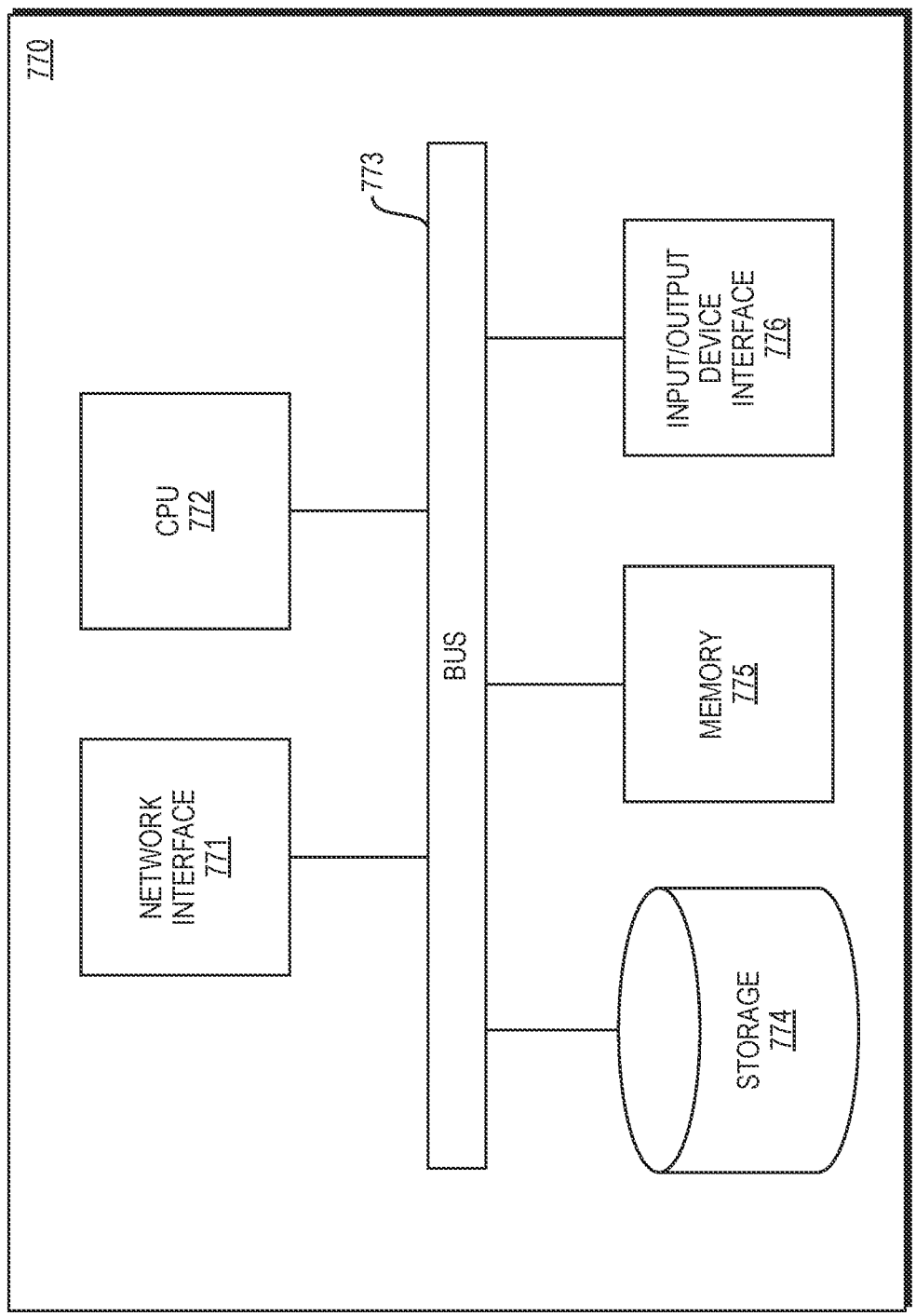
FIG. 7 is a simplified block diagram of a computer system for processing telemetry data according to an embodiment.

FIG. 7 is a simplified block diagram of a computer-based system 770 that may be used to determine event occurrence based on telemetry data according to any variety of the embodiments of the present disclosure described herein. The system 770 comprises a bus 773. The bus 773 serves as an interconnect between the various components of the system 770. Connected to the bus 773 is an input/output device interface 776 for connecting various input and output devices such as a keyboard, mouse, touch screen, display, speakers, etc. to the system 770. A central processing unit (CPU) 772 is connected to the bus 773 and provides for the execution of computer instructions. Memory 775 provides volatile storage for data used for carrying out computer instructions. Storage 774 provides non-volatile storage for software instructions, such as an operating system (not shown). The system 770 also comprises a network interface 771 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 770, or a computer network environment such as the computer environment 880, described herein below in relation to FIG. 8. The computer system 770 may be transformed into the machines that execute the methods described herein, for example, by loading software instructions implementing method 100 into either memory 775 or non-volatile storage 774 for execution by the CPU 772. One of ordinary skill in the art should further understand that the system 770 and its various components may be configured to carry out any embodiments or combination of embodiments of the present disclosure described herein. Further, the system 770 may implement the various embodiments described herein utilizing any combination of hardware, software, and firmware modules operatively coupled, internally, or externally, to the system 770.

Figure 8:
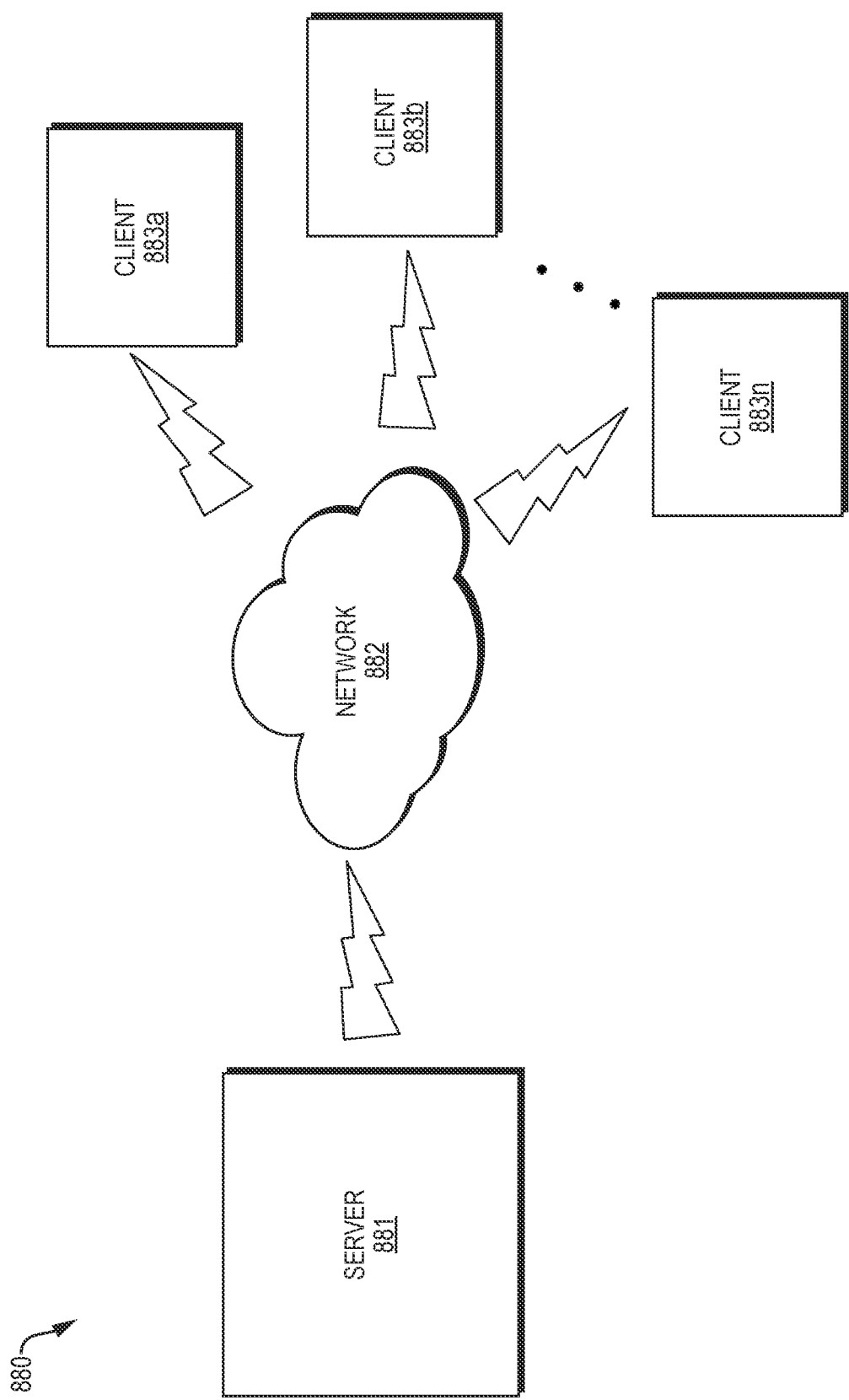
FIG. 8 is a simplified block diagram of a computer network environment in which embodiments of the present invention may be implemented.

FIG. 8 illustrates a computer network environment 880 in which an embodiment of the present disclosure may be implemented. In the computer network environment 880, the server 881 is linked through the communications network 882 to the clients 883a-n. The environment 880 may be used to allow the clients 883a-n, alone or in combination with the server 881, to execute any of the embodiments described herein. For non-limiting example, computer network environment 880 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for determining event occurrence based on telemetry data, the method comprising:
   receiving telemetry data, an indication of a rule for processing the received telemetry data, and the rule, the received rule defining one or more filters for the processing;
   modifying a rule engine in accordance with the received rule by defining runtime state functionality of a finite state automaton, implemented by the rule engine, in accordance with the received rule; and
   processing the received telemetry data with the modified rule engine to determine event occurrence.

2. The method of claim 1 wherein the telemetry data is based on at least one of: a Hypertext Transfer Protocol (HTTP) transaction and processing the HTTP transaction.

3. The method of claim 1 wherein the telemetry data is based on multiple HTTP transactions.

4. The method of claim 1 wherein the rule is constructed and defined in accordance with a grammar.

5. The method of claim 1 wherein the processing comprises:
   identifying which of the one or more filters are activated in processing the received telemetry data; and
   determining event occurrence based on the identified activated filters.

6. The method of claim 1 wherein the rule further defines at least one of:
   output of a first filter utilized by a second filter;
   an event profile comprising a group of filters or sequence of filters;
   a feature comprising one or more event profiles; and
   a namespace comprising one or more features.

7. The method of claim 6 wherein:
   modifying the rule engine in accordance with the received rule comprises modifying the rule engine in accordance with the event profile; and
   processing the received telemetry data with the rule engine modified in accordance with the event profile comprises determining event occurrence if the one or more filters are activated in accordance with the event profile.

8. The method of claim 6 wherein:
   modifying the rule engine in accordance with the received rule comprises modifying the rule engine in accordance with the namespace and an event profile associated with the namespace; and
   processing the received telemetry data with the rule engine modified in accordance with the namespace and the event profile associated with the namespace comprises determining event occurrence if the one or more filters are activated in accordance with the event profile associated with the namespace.

9. The method of claim 1 wherein the event is:
   a performance degradation;
   a security breach;
   a hijacked session; or
   a behavior defined by the rule.

10. The method of claim 1 wherein the processing determines event occurrence in real-time.

11. A system for determining event occurrence based on telemetry data, the system comprising:
   a processor; and
   a memory with computer code instructions stored thereon, the processor and the memory, with the computer code instructions, being configured to cause the system to:

receive telemetry data, an indication of a rule for processing the received telemetry data, and the rule, the received rule defining one or more filters for the processing;

modify a rule engine in accordance with the received rule by defining runtime state functionality of a finite state automaton, implemented by the rule engine, in accordance with the received rule; and process the received telemetry data with the modified rule engine to determine event occurrence.

12. The system of claim 11 wherein the telemetry data is based on at least one of: a Hypertext Transfer Protocol (HTTP) transaction and processing the HTTP transaction.

13. The system of claim 11 wherein the rule is constructed and defined in accordance with a grammar.

14. The system of claim 11 wherein to process the received telemetry data with the modified rule engine, the processor and the memory, with the computer code instructions, are further configured to cause the system to:

identify which of the one or more filters are activated in processing the received telemetry data; and determine event occurrence based on the identified activated filters.

15. The system of claim 11 wherein the rule further defines at least one of:

output of a first filter utilized by a second filter;

an event profile comprising a group of filters or sequence of filters;

a feature comprising one or more event profiles; and a namespace comprising one or more features.

16. The system of claim 15 wherein:

to modify the rule engine in accordance with the received rule, the processor and the memory, with the computer code instructions, are further configured to cause the system to modify the rule engine in accordance with the event profile; and to process the received telemetry data with the rule engine modified in accordance with the event profile, the processor and the memory, with the computer code instructions, are further configured to cause the system to determine event occurrence if the one or more filters are activated in accordance with the event profile.

17. The system of claim 15 wherein:

to modify the rule engine in accordance with the received rule, the processor and the memory, with the computer code instructions, are further configured to cause the system to modify the rule engine in accordance with the namespace and an event profile associated with the namespace; and to process the received telemetry data with the rule engine modified in accordance with the namespace and the event profile associated with the namespace, the processor and the memory, with the computer code instructions, are further configured to cause the system to determine event occurrence if the one or more filters are activated in accordance with the event profile associated with the namespace.

18. A non-transitory computer program product for determining event occurrence, the computer program product executed by a server in communication across a network with one or more clients and comprising:

a computer readable medium, the computer readable medium comprising program instructions, which, when executed by a processor, causes the processor to:

receive telemetry data, an indication of a rule for processing the received telemetry data, and the rule, the received rule defining one or more filters for the processing;

modify a rule engine in accordance with the received rule by defining runtime state functionality of a finite state automaton, implemented by the rule engine, in accordance with the received rule; and process the received telemetry data with the modified rule engine to determine event occurrence.

* * * * *